(12) United States Patent
Voruganti et al.

(10) Patent No.: US 8,462,815 B2
(45) Date of Patent: Jun. 11, 2013

(54) ACCURATE MEASUREMENT OF PACKET SIZE IN CUT-THROUGH MODE

(75) Inventors: Sreenivas Voruganti, Bangalore (IN); Balaji Murali, Bangalore (IN); Ashish Pal, New Delhi (IN); Rahul Jain, Bangalore (IN); Sainath Cheruvu, Ananthapur (IN)

(73) Assignee: Juniper Networks, Inc., Sunnyvale, CA (US)

( * ) Notice: Subject to any disclaimer, the term of this patent is extended or adjusted under 35 U.S.C. 154(b) by 225 days.

(21) Appl. No.: 12/874,385

(22) Filed: Sep. 2, 2010

(65) Prior Publication Data

US 2012/0057601 A1    Mar. 8, 2012

(51) Int. Cl.
 *H04J 3/16* (2006.01)
 *H04J 3/22* (2006.01)
 *H04L 12/28* (2006.01)
 *H04L 12/56* (2006.01)

(52) U.S. Cl.
 USPC ............................ 370/470; 370/389; 370/472

(58) Field of Classification Search
 USPC .................................. 370/389, 465, 470, 472
 See application file for complete search history.

(56) References Cited

U.S. PATENT DOCUMENTS

| | | | |
|---|---|---|---|
| 2001/0051862 A1* | 12/2001 | Ishibashi et al. | 703/14 |
| 2002/0120942 A1* | 8/2002 | Avison | 725/135 |
| 2004/0184447 A1* | 9/2004 | Nadell et al. | 370/360 |
| 2005/0021885 A1* | 1/2005 | Anderson et al. | 710/29 |
| 2008/0018928 A1* | 1/2008 | Meziani et al. | 358/1.15 |
| 2008/0151751 A1* | 6/2008 | Ponnuswamy et al. | 370/232 |

* cited by examiner

*Primary Examiner* — Ronald Abelson
(74) *Attorney, Agent, or Firm* — Harrity & Harrity, LLP (57) ABSTRACT

A network device operating in a cut-through mode receives a current packet of an unknown length and determines if there is a known length value of a previous packet in a processing cycle associated with the current packet. When there is no known length value of the previous packet, the network device applies, to the current packet, an estimated length value for the current packet. When there is a known length value of the previous packet, the network device applies, to the current packet, the known length value of the previous packet. The network device processes the current packet based on one of the estimated length value or the known length value of the previous packet.

20 Claims, 7 Drawing Sheets

ACCURATE MEASUREMENT OF PACKET SIZE IN CUT-THROUGH MODE

BACKGROUND

In Internet Protocol (IP) packet-based networks, network devices (e.g., routers, switches, etc.) may handle the transmission of packets through the network. In some network devices, cut-through switching may be implemented to reduce latency through the network device. In cut-through mode, the network device starts forwarding a packet before the whole packet (or frame) has been received. One drawback of cut-through mode is that the length of an incoming packet is unknown before the packet starts being transmitted by the network device. Thus, use of cut-through mode can either preclude providing features that are based on packet length or can require that default values for packet length be used to provide these features. If a default value is used, there will be deviations between an actual packet length and the default value. Such deviations may become more significant when the default value is applied successively to a group of packets, decreasing the accuracy and/or efficiency of network device features that rely on packet length data.

SUMMARY

According to one aspect, a method may be performed by a network device operating in a cut-through mode. The method may include receiving, by a processor of the network device, a current packet of an unknown length and determining, by the processor, if there is a known length value of a previous packet in a processing cycle associated with the current packet. The method may further include applying, by the processor and to the current packet, an estimated length value for the current packet when there is no known length value of the previous packet; and applying, by the processor and to the current packet, the known length value of the previous packet, when there is a known length value of the previous packet. The method may also include processing, by the processor, the current packet based on one of the estimated length value or the known length value of the previous packet.

According to another aspect, a network device may include a packet processor to receive a packet forwarded in a cut-through mode, where the packet is of an unknown length and determine if the packet is a first packet of a processing cycle. When the packet is the first packet of the processing cycle, the packet processor may associate an estimated length value with the packet. When the packet is not the first packet of the processing cycle, the packet processor may associate, with the packet, an actual length value of a previous packet of the processing cycle, where the previous packet is received by the network device before the packet. The packet processor may process the packet based on one of the estimated length value or the actual length value of the previous packet.

According to still another aspect, a method may include receiving, by a processor, a current packet, of an unknown length, within a processing cycle; determining, by the processor, an actual length value of a previous packet of the processing cycle, where the previous packet is received by the network device before the current packet; and storing, by the processor and in a memory, the actual length value of the previous packet. The method may also include applying, by the processor and to the current packet, the actual length value of the previous packet; and processing, by the processor, the current packet based on the actual length value of the previous packet. The method may further include determining, by the processor, an actual length value of the current packet, and overwriting, by the processor and in the memory, the actual length value of the previous packet with the actual length value of the current packet.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Systems and/or methods described herein may be used to apply accurate packet length values for packet processing of a series of packets when operating in a cut-through mode. In one implementation, a network device may receive a current packet of an unknown length and may determine if there is a known length value of a previous packet in a processing cycle associated with the current packet. When there is no known length value of the previous packet, the network device may apply, to the current packet, an estimated length value for the current packet. When there is a known length value of the previous packet, the network device may apply, to the current packet, the known length value of the previous packet. The systems and/or methods may process the current packet based on the estimated length value or the known length value of the previous packet.

The term "packet," as used herein, may refer to a packet, a datagram, or a cell; a fragment of a packet, a fragment of a datagram, a fragment of a cell; or another type, arrangement, or packaging of data. Also, depending on context, as used herein, the terms "length" and "size" may be used interchangeably to refer to a number of bytes in a packet.

Figure 1:
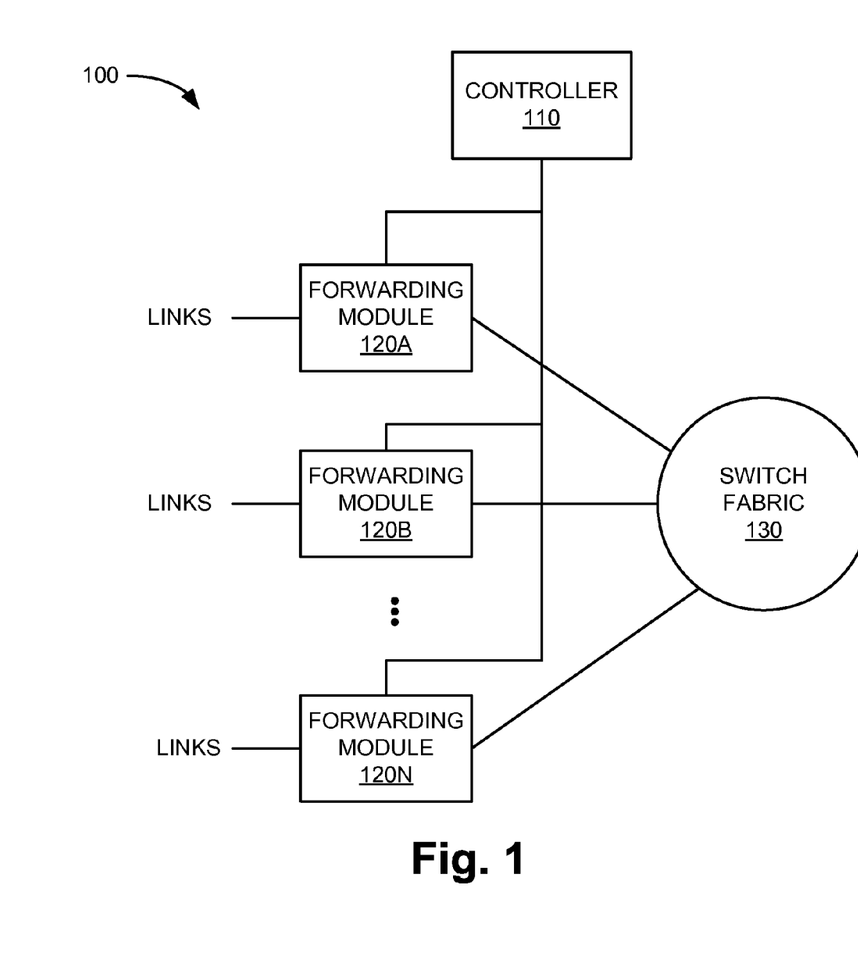
FIG. 1 is a diagram of an example network device in which systems and/or methods described herein may be implemented.

FIG. 1 is a diagram of an example network device 100 in which systems and/or methods described herein may be implemented. In this particular implementation, network device 100 may take the form of a router, although the systems and/or methods herein may be implemented in another type of network device. For example, network device 100 may include another data transfer device, such as a gateway, a switch, a firewall, a network interface card (NIC), a hub, a bridge, a proxy server, an optical add-drop multiplexer (OADM), or some other type of device that processes and/or transfers traffic.

Network device 100 may receive one or more packet streams from physical links, may process the packet stream(s) to determine destination information, and may transmit the packet stream(s) out on links in accordance with the destination information. Network device 100 may include a controller 110, forwarding modules 120A, 120B, . . . , 120N (referred to collectively as "forwarding modules 120" and generically referred to as "forwarding module 120"), and a switch fabric 130.

Controller 110 may perform high level management functions for network device 100. For example, controller 110 may maintain the connectivity and manage information/data necessary for transferring packets by network device 100. Controller 110 may create routing tables based on network topology information, create forwarding tables based on the routing tables, and communicate the forwarding tables to forwarding modules 120. Forwarding modules 120 may use the forwarding tables to perform route lookup for incoming packets and perform the forwarding functions for network device 100. Controller 110 may also perform other general control and monitoring functions for network device 100.

Each of forwarding modules 120 may be connected to controller 110 and switch fabric 130. Forwarding modules 120 may receive packet data on physical links connected to a network, such as a wide area network (WAN) or a local area network (LAN). Each physical link could be one of many types of transport media, such as an optical fiber or an Ethernet cable.

Forwarding modules 120 may process incoming packet data prior to transmitting the data to another forwarding module or the network. Forwarding modules 120 may also perform route lookups for the data using the forwarding table from controller 110 to determine destination information. If the destination indicates that the data should be sent out on a physical link connected to one of forwarding modules 120, then forwarding module 120 prepares the data for transmission by, for example, adding any necessary headers and/or modifying existing headers, and transmits the data from the port associated with the physical link. If the destination indicates that the data should be sent to another forwarding module 120 via switch fabric 130, then forwarding module 120 prepares the data for transmission to the other forwarding module 120, if necessary, and sends the data to the other forwarding module 120 via switch fabric 130.

Switch fabric 130 may include one or multiple switching planes to facilitate communication among forwarding modules 120 and/or controller 110. In one implementation, each of the switching planes may include a single-stage switch or a multi-stage switch of crossbar elements. Switch fabric 130 may also, or alternatively, include processors, memories, and/or paths that permit communication among forwarding modules 120.

Although, FIG. 1 illustrates example components of network device 100, in other implementations, network device 100 may include additional components, fewer components, different components, or differently arranged components than those illustrated in FIG. 1 and described herein. Additionally, or alternatively, one or more operations described as being performed by a particular component of network device 100 may be performed by one or more other components, in addition to or instead of the particular component of network device 100.

Figure 2:
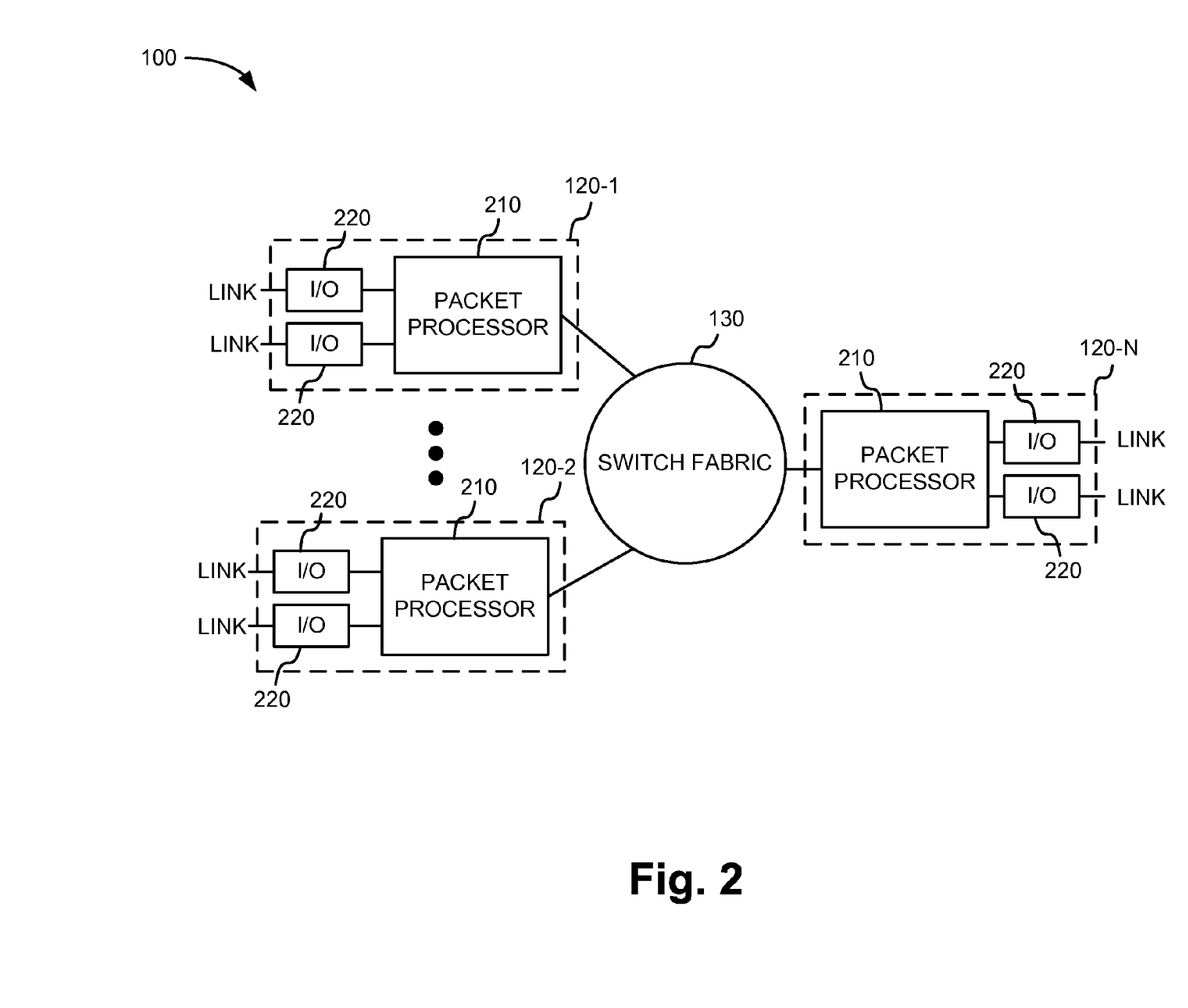
FIG. 2 is a detailed block diagram illustrating portions of the network device shown in FIG. 1.

FIG. 2 is a detailed block diagram illustrating portions of network device 100. Forwarding modules 120 may connect to one another through switch fabric 130. Each of forwarding modules 120 may include one or more packet processors 210 and input/output (I/O) interfaces 220. Although FIG. 2 shows two I/Os 220 connected to each of packet processors 210 and three packet processors 210 connected to switch fabric 130, in other implementations, there can be more or fewer I/Os 220 and packet processors 210.

Each of packet processors 210 performs packet forwarding functions and handles packet transfers to and from I/Os 220 and switch fabric 130. For each packet, a packet processor 210 performs the previously-discussed lookup function and may perform other processing-related functions, discussed in additional detail below.

I/Os 220 may transmit data between a physical link and packet processor 210. In one implementation, each of I/Os 220 may be a physical interface card (PIC). Different I/Os 220 may be designed to handle different types of network links. For example, one of I/Os 220 may be an interface for an optical link while another of I/Os 220 may be an interface for an Ethernet link, implementing any of a number of well-known protocols.

For incoming data, in one implementation, I/Os 220 may strip off the layer 1 (L1) protocol information and forward the remaining data, such as raw packets, to packet processor 210. For outgoing data, I/Os 220 may receive packets from packet processor 210, encapsulate the packets in L1 protocol information, and transmit the data on the physical link or "wire."

Figure 3:
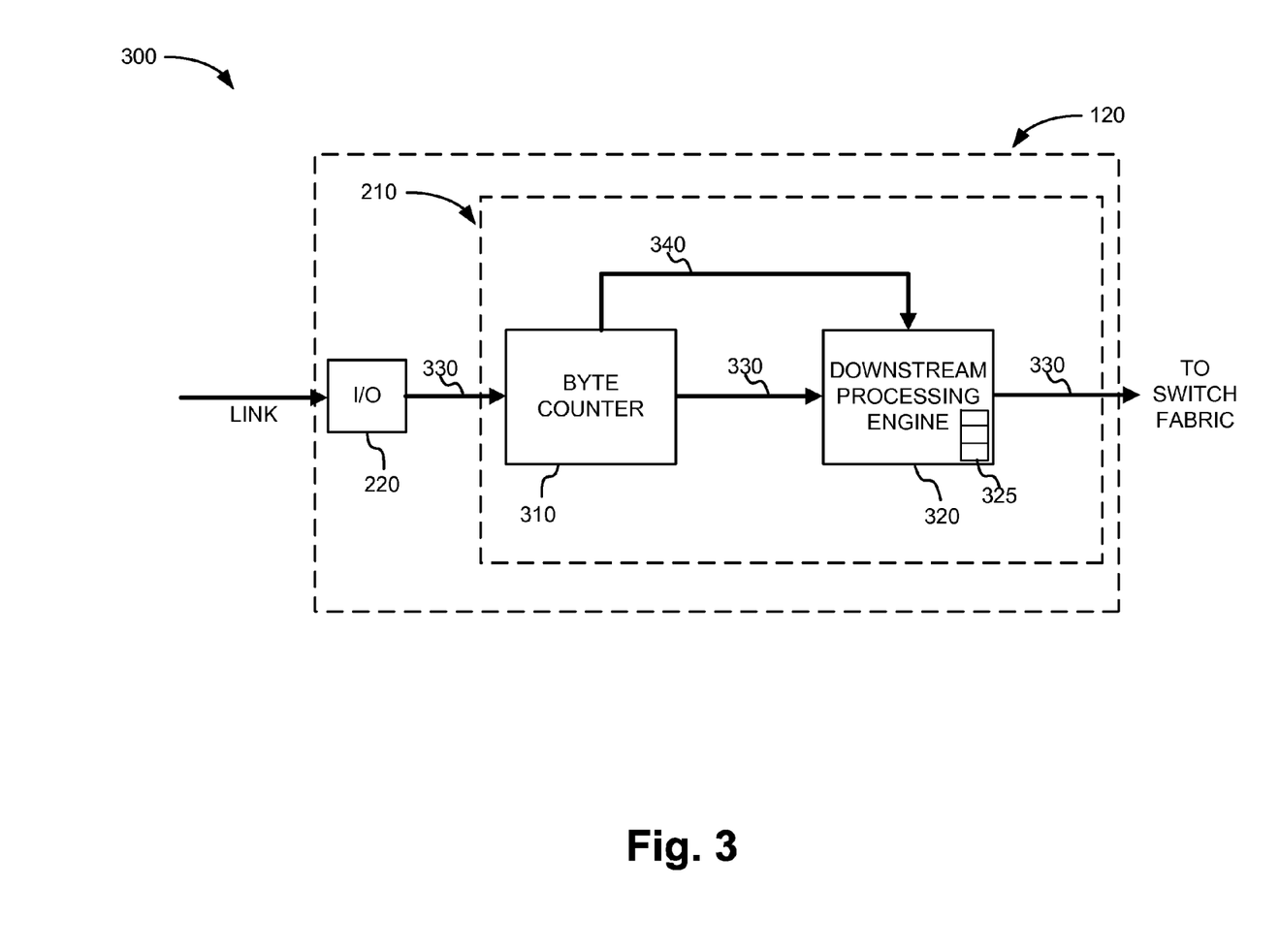
FIG. 3 is a functional block diagram showing communications within a portion of the network device shown in FIG. 1 according to an implementation described herein.

FIG. 3 is a functional block diagram showing communications within a portion 300 of network device 100 according to an implementation described herein. Portion 300 may include packet processor 210 and I/O 220. Packet processor 210 may include a byte counter 310 and a downstream processing engine 320 fed by a packet stream 330. Packet processor 210 may also include a forward communications path 340 between byte counter 310 and downstream processing engine 320.

Packet processors 210 may generate notifications for received packets. The notifications may include a reference to the actual packet data stored in memory and the appropriate outgoing interface (e.g., an outgoing port on one of I/Os 220) associated with the packet. The notifications may be stored in one or more queues corresponding to the outgoing interface. For the sake of simplicity, notifications, referencing packet data, are referred to herein as packets themselves.

Byte counter 310 may include hardware or a combination of hardware and software to track the number of bytes in packets transmitted or received over packet stream 330. In an implementation using cut-through mode described herein, byte counter 310 may not know the actual packet length of an incoming packet before a first portion of the packet is output to downstream processing engine 320.

Downstream processing engine 320 may include hardware or a combination of hardware and software that provides packet processing services (or features) based on an identified packet length of packets transmitted or received over packet stream 330. For example, features provided by downstream processing engine 320 based on packet length may include priority flow control, port/queue traffic shaping, queue scheduling, traffic policing, tail-drop processing, counting, etc. Priority flow control processing may use a flow control signal associated with a port to control the flow of packets at the port by, for example, initiating flow control measures to alleviate congestion at an output port by dropping packets, downgrading packets to lower priorities, etc. Port/queue traffic shaping may include controlling traffic in order to optimize or guarantee performance, low latency, and/or bandwidth by delaying and/or scheduling packets. Traffic policing may include controlling a maximum rate of traffic sent and/or received on an interface. Tail-drop processing may include dropping more recently received packets if data consumes too much memory in the queues (i.e., data is enqueued at a faster rate than it is dequeued). Counting may include, for example, measuring data flows and/or generating traffic processing statics.

Packet stream 330 may include one or more queues (not shown) to mange traffic flows. Once data (e.g., a packet or a portion of a packet) from packet stream 330 is output by byte counter 310, additional downstream processing may be performed by downstream processing engine 320. In one implementation, the processing performed by downstream processing engine 320 may rely on a packet length value for each packet in packet stream 330. Although use of packet byte length is primarily described herein, it should be understood that any suitable data size unit may be used as a basis for calculations by downstream processing engine 320.

Because, in cut-through mode generally, downstream processing engine 320 may be initially unaware of the packet size of an incoming packet in packet stream 330, potential inaccuracies in the processing may result. While a default packet length value may be used to provide approximations for actual packet sizes, the default packet length value can cause calculations by downstream processing engine 320 to be less accurate than actual packet length values. For example, consistent use of a maximum transfer unit (MTU) value as a default packet length may cause downstream processing engine 320 to over-estimate actual data flow and result in under-utilization of buffer capacity.

To remedy this effect, forward communications path 340 may be provided between byte counter 310 and downstream processing engine 320. In one implementation, forward communications path 340 may deliver information, from byte counter 310 to downstream processing engine 320, that represents the determined (e.g., actual) packet length of the previous complete packet to pass through byte counter 310. In one implementation, the packet length of the previous complete packet may correspond to the packet immediately preceding the packet currently being processed by downstream processing engine 320. In another implementation, packet length of the previous complete packet may correspond to an earlier packet (that is, the previous complete packet for which a packet length was calculated may be separated in sequence, by one or more other packets, from the packet currently being processed by downstream processing engine 320). In one implementation, downstream processing engine 320 may temporarily store, in a memory, the packet length value of the previous complete packet for application to a current packet. When the packet length value for the next (or current) packet is determined, the packet length value of the previous complete packet may be overwritten with the packet length value for the current packet.

For packets that are not the first packet in a processing cycle, downstream processing engine 320 may substitute the received information (e.g., the packet length value of the previous packet) as a packet length value for a next packet (e.g., a current packet that has been transmitted from byte counter 310) to thereby improve the accuracy of the packet processing and increase system performance. A processing cycle may include, for example, a time-based iteration (e.g., measured in microseconds) and/or size-based iteration (e.g., measured in bytes) for performing services (e.g., by downstream processing engine 320). While forward communications path 340 is shown as a separate path from packet stream 330, in other implementations forward communications path 340 may be included within packet stream 330. In another implementation, byte counter 310 and downstream processing engine 320 may be included as a single component.

Downstream processing engine 320 may differentiate between a first packet (for which no previous packet length values may be available) of a processing cycle and subsequent packets of the processing cycle. When a previous packet value is not available (e.g., for the first packet in a processing cycle), downstream processing engine 320 may use an estimated packet value for the packet. In one implementation, downstream processing engine 320 may include (or may access) a series of configurable registers 325 which contain estimated packet length values for a variety of output streams. For example, downstream processing engine 320 may match a header entry from a first packet with a value from one configurable register 325 reflecting the number of bytes that may be associated with the corresponding packet. In another implementation, downstream processing engine 320 may retrieve a default value (such as a MTU value) for the first packet. There may be several configurable registers 325, and downstream processing engine 320 may select the appropriate one based on the header information detected by downstream processing engine 320.

Although, FIG. 3 illustrates example components of device portion 300, in other implementations, device portion 300 may include additional components, fewer components, different components, or differently arranged components than those illustrated in FIG. 3 and described herein. Additionally, or alternatively, one or more operations described as being performed by a particular component of device portion 300 may be performed by one or more other components, in addition to or instead of the particular component of device portion 300.

Figure 4:
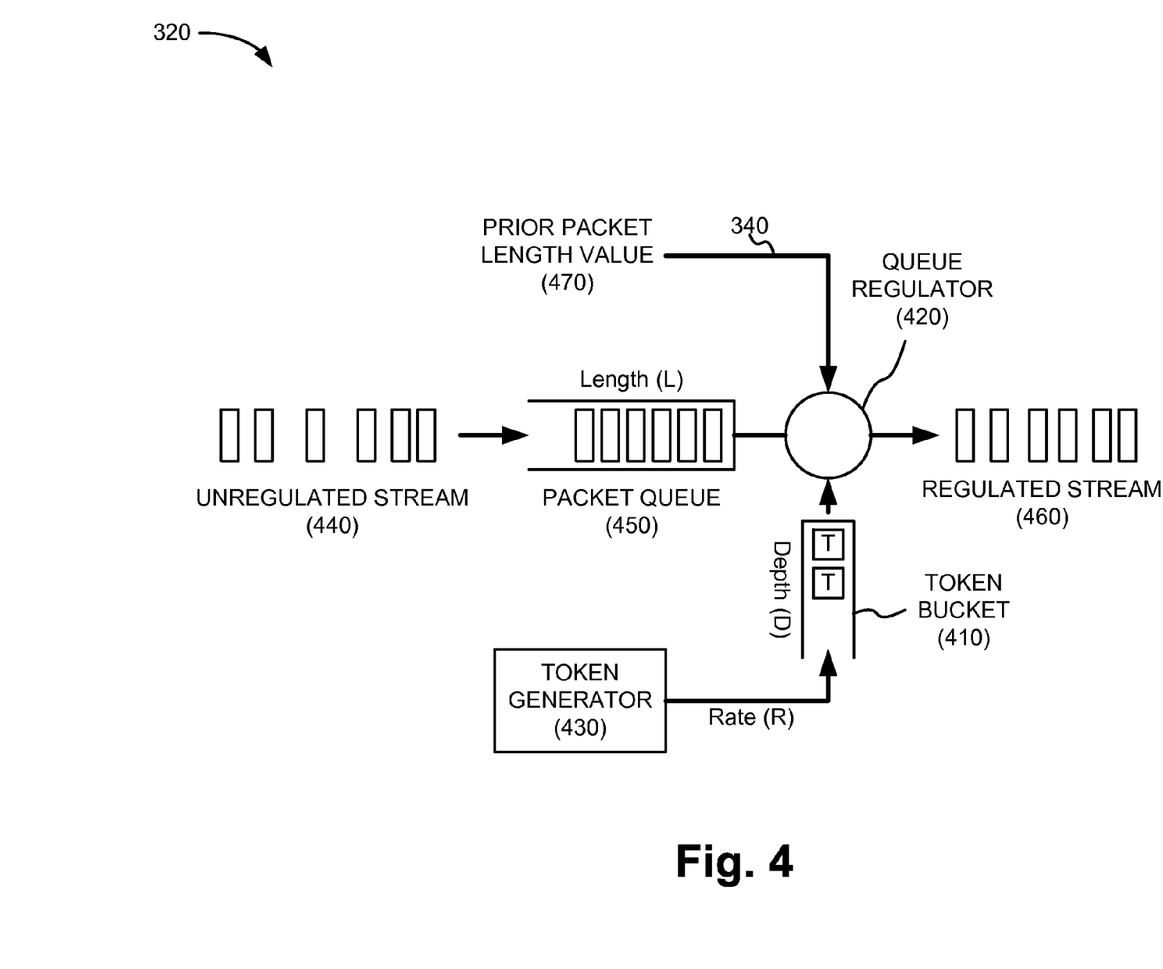
FIG. 4 is a block diagram showing communications within a downstream processing engine of FIG. 3.

FIG. 4 is a block diagram showing communications within downstream processing engine 320 according to an implementation described herein. In the implementation of FIG. 4, downstream processing engine 320 may correspond to a traffic shaping tool (referred to herein as "shaping tool 320"). Shaping tool 320 may enforce a long-term average transmission rate while permitting bounded bursts. As shown in FIG. 4, a token bucket 410 may be used to manage a queue regulator 420 that controls the rate of flow of a packet stream (e.g., packet stream 330) into a network.

A token generator 430 may consistently produce tokens ("T") at a rate of R tokens per second and place them into token bucket 410 with a depth of D tokens. Assuming that each token grants the ability to transmit a fixed number of bytes, if the token bucket fills, newly generated tokens can be discarded. At the same time, an unregulated stream 440 of packets may arrive and may be placed into a packet queue 450 that has a maximum length of L. If the incoming flow from unregulated stream 440 delivers more packets than packet queue 450 can store, the excess packets may be discarded.

Queue regulator 420 can consider a number of factors when deciding whether a packet can be forwarded into regulated stream 460. A certain number of tokens, P, may be required to allow the packet to pass through queue regulator 420, based on the length of the packet. In an implementation described herein, the length of the packet may be assigned a packet length value 470 of the previous packet when downstream processing engine 320 uses cut-though mode. If token bucket 410 is full (e.g., contains a maximum allowed amount of tokens), the packet can forwarded into regulated stream 460 and P tokens can be removed from token bucket 410. If token bucket 410 is empty a packet may wait at the head of packet queue 450 until P tokens are generated and placed in token bucket 410. When token bucket 410 eventually contains P tokens, the packet can be sent into regulated stream 460 and P tokens can be removed from token bucket 410.

Finally, assume that token bucket 410 is only partially full and contains C tokens. If P is less than or equal to C, P tokens are removed from token bucket 410 and the packet is forwarded into regulated stream 460. If P is greater than C, queue regulator 420 must wait for the remaining P minus C tokens before it can send the packet to regulated stream 460. When token bucket 410 contains the required P tokens, the packet is forwarded into the network and P tokens are removed from token bucket 410.

Although FIG. 4 illustrates example components of shaping tool 320, in other implementations, shaping tool 320 may include additional components, fewer components, different components, or differently arranged components than those illustrated in FIG. 4 and described herein. Additionally, or alternatively, one or more operations described as being performed by a particular component of shaping tool 320 may be performed by one or more other components, in addition to or instead of the particular component of shaping tool 320.

Conventionally, cut-through mode may require queue regulator 420 to implement packet-based shaping, where all packets are treated as if they have a byte-count equal to MTU for token bucket 410, instead of an actual packet byte-count. Packet-based shaping may result in less-than-accurate scheduling rates, since an approximate packet length (MTU) is used repeatedly rather than actual packet length. In contrast, use of packet length value 470 in cut-though mode may provide higher shaping accuracy.

Figure 5:
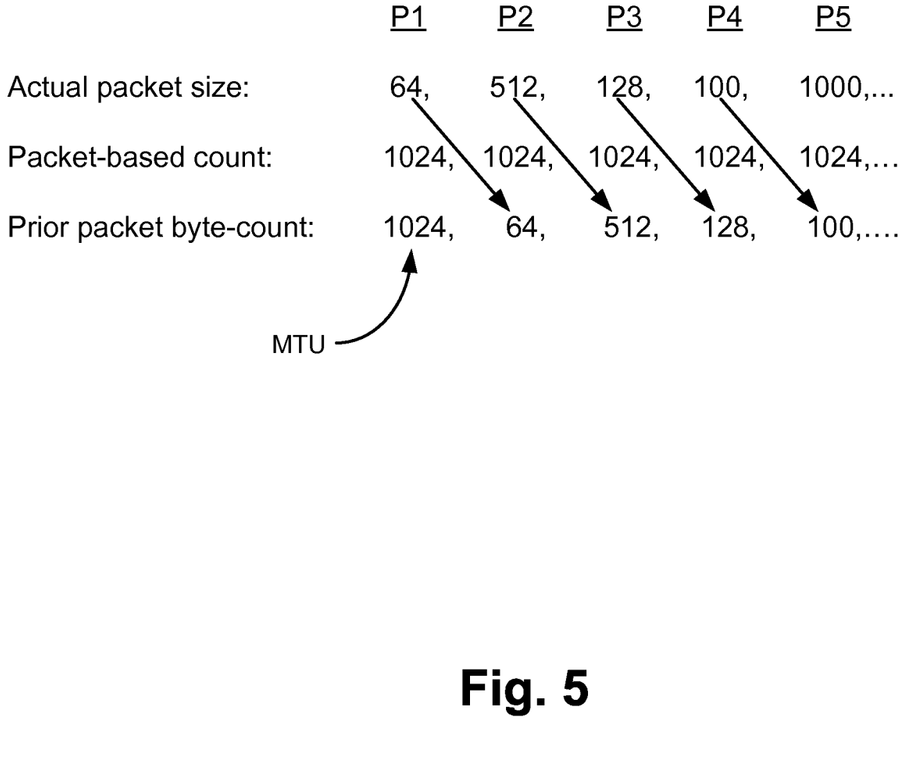
FIG. 5 is an illustration of length values assigned to a packet sequence for a packet queue of FIG. 4.

FIG. 5 provides an illustration of length values assigned to a packet sequence for packet queue 450. Assume, as shown in FIG. 5, that a packet sequence on queue 450 includes packets P1-P5. Assume that the actual length of P1, P2, P3, P4, and P5 is 64 bytes, 512 bytes, 128 bytes, 100 bytes, and 1000 bytes, respectively. If packet-based shaping is used, all of the packets P1-P5 are treated to have packet size equal to the MTU, which, as shown in FIG. 5 (e.g., "packet-based count"), may be 1024 bytes. In an implementation herein, the packet byte-count may reflect the actual packet sequence in queue 450, albeit delayed by a single packet. Thus, as again shown in FIG. 5 (e.g., "prior packet byte-count"), the assigned length of P2, P3, P4, and P5 may be 64 bytes, 512 bytes, 128 bytes, and 100 bytes, respectively.

When using the prior packet byte-count, a default packet length may be used only for the first arriving packet, P1, whose packet size is undetermined. The default packet length for the first packet, P1, may include a configured value, such as the MTU (as shown in FIG. 5), a calculated average packet length (e.g., from a previous group of packets, or another length value). Subsequent packets (e.g., P2-P5) after the first packet, P1, may be assigned the actual length of the previous packet. Use of the actual length from the previous packet can provide more accurate shaping calculation (e.g., for the series of packets P1-P5) than, for example, an assumption of a fixed default packet size independent of actual packet size of the traffic.

Still referring to FIG. 5, assume that shaping by queue regulator 420 is configured to allow 4000 bytes per millisecond. Using default values for packet-based shaping (e.g., "packet-based count"), queue regulator 420 can transfer only the first three packets (e.g., P1, P2, and P3) because each packet length is assumed to be 1024 bytes (e.g., 1024 bytes+1024 bytes+1024 bytes=3072 bytes). The actual number of bytes transmitted (e.g., "actual packet size") would have been only 804 bytes (e.g., 64 bytes+512 bytes+128 bytes+100 bytes=804 bytes). Thus, there is significant deviation between the assumed amount of transferred bytes and the actual amount of transferred bytes. However, using a prior packet byte-count, according to an implementation herein, queue regulator 420 would transmit five or more packets (1024 bytes+64 bytes+512 bytes+128 bytes+100 bytes+1000 bytes . . . up to 4000 bytes). Thus, using a prior packet byte-count reduces the deviation from actual values significantly in contrast with packet-based shaping. In fact, except for the first and last packet in the token bucket interval, use of the prior packet byte-count is completely accurate. The error between the actual traffic pattern and the pattern seen by queue regulator 420 may be inaccurate only for the first packet (P1), which may be considered negligible compared to the total amount of packets shaped.

While the FIGS. 4 and 5 provide a particular implementation as relating to traffic queue shaping, concepts described herein may apply similarly to other packet-length-based features provided by network device 100, such as priority flow control, port traffic shaping, queue scheduling, policing, tail-drop thresholds, counters, etc.

Figure 6:
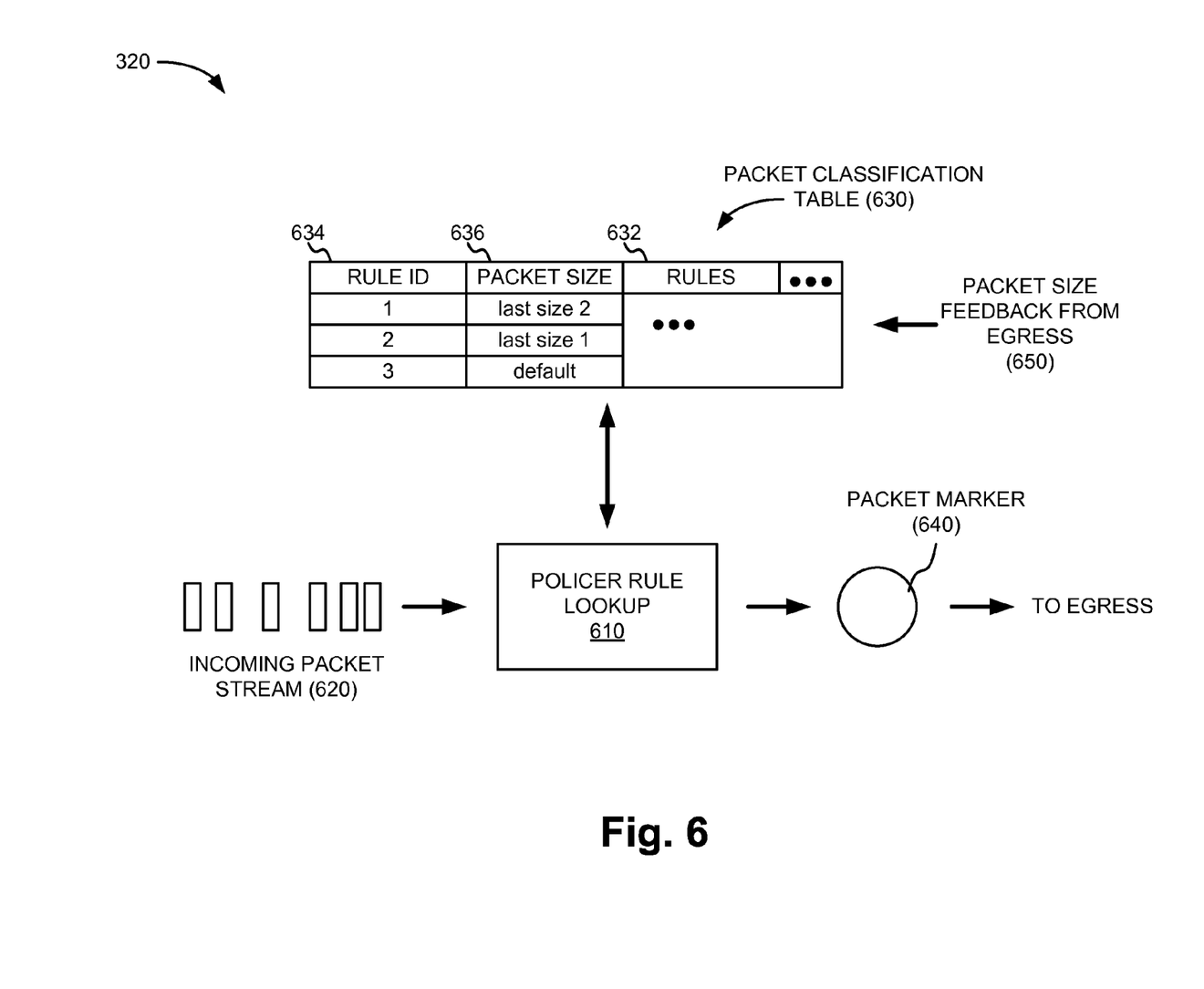
FIG. 6 is a block diagram showing communications within a portion of the network device shown in FIG. 1 according to another implementation described herein.

FIG. 6 is a block diagram showing communications within downstream processing engine 320 according to another implementation described herein. In the implementation of FIG. 6, downstream processing engine 320 may correspond to a policing tool (referred to herein as "policing tool 320"). "Policing" as used herein may refer to the ability to measure a data rate and then shape the data rate to a specified threshold. For example, policing tool 320 may be used to control bandwidth and deliver tiered service-level agreements (SLAs) based on specific subscriber or application requirements.

As shown in FIG. 6, policer rule lookup function 610 may perform a lookup of incoming packets and/or packet headers (e.g., from incoming packet stream 620) using a packet classification table 630. Packet classification table 630 may include rules field 632, a rule identifier (ID) field 634, and a packet size field 636, among other fields. Rules field 632 may include, for example, sources and/or destinations and corresponding traffic limits that may be applied to packets to/from the sources and/or destinations. Rule identifier field 634 may include a unique identifier for a corresponding rule. Packet size field 636 may include an assigned packet size for a packet associated with a corresponding rule.

Policing is typically implemented in an ingress side of network device 100. In an implementation herein, packet classification table 620 may provide a mechanism to obtain the size of a previous packet to determine data rates associated with policing functions. Packet classification table 620 may map a policer rule identifier (e.g., from rule identifier field 634) with a packet size (e.g., from packet size field 636). Initially, values for packet size field 636 may be filed with a default size (e.g., an MTU value or another packet length value). Whenever policer rule lookup function 610 matches a packet to a rule identifier (e.g., from rule identifier field 634), policer rule lookup function 610 may assume the packet size to be the current value in corresponding packet size field 636. Also, when policer rule lookup function 610 matches a packet to the rule identifier, packet marker 640 may tag the packet with the corresponding entry from rule identifier field 634. In one implementation, the rule identifier may be added to a header of the packet. The rule identifier may be carried with the packet through network device 100 to an egress forwarding module (not shown), where eventually the packet may be reordered and the packet length can be determined.

Using the tagged rule identifier, network device 100 can determine which port the packet egresses out of and the length of the packet while transmitting out. The egress forwarding module may provide packet size feedback 650 to update packet classification table 630. More particularly, packet size feedback 650 may be use to update an entry in packet size field 636 corresponding entry in to rule identifier field 634. Thus, the next packet (e.g., from incoming packet stream 620 to be matched to that particular entry in to rule identifier field 634 can be assumed to be of the packet sized provided from packet size feedback 650. For each entry in rule identifier field 634, the effective delta will only be the last packet's delta with the default packet size used to initially populate packet size field 636.

Figure 7:
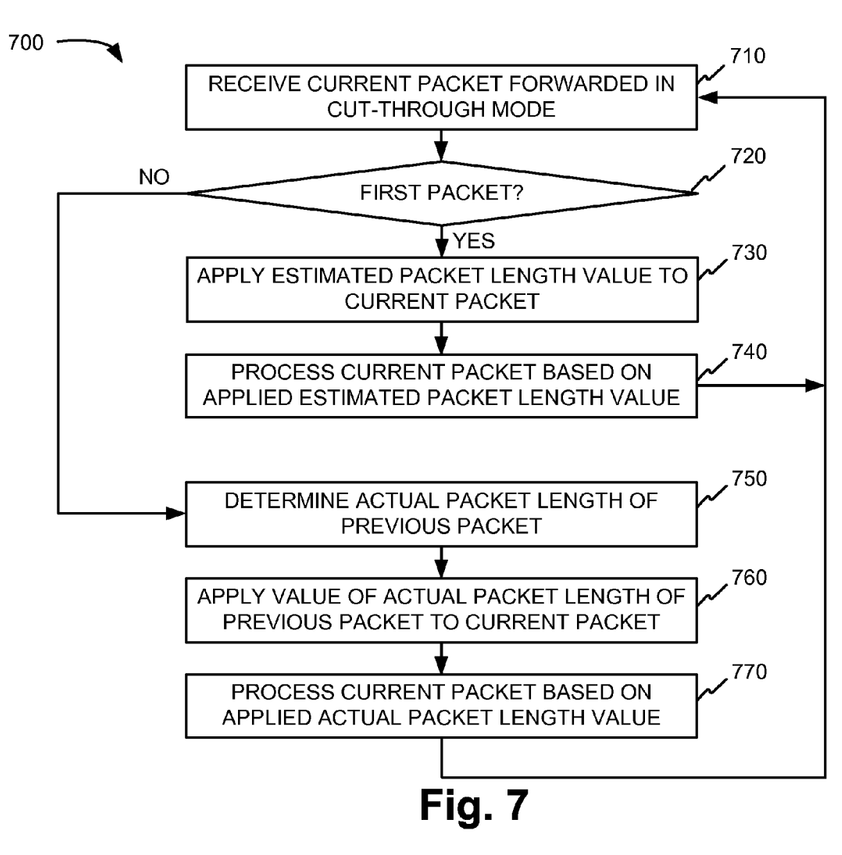
FIG. 7 is a flow chart of an example process for applying actual packet length values in cut-through mode according to an implementation described herein.

FIG. 7 is a flow chart of an example process 700 for applying actual packet length values in cut-through mode according to an implementation described herein. In one implementation, process 700 may be performed by packet processor 210. In another implementation, some or all of process 700 may be performed by another component or group of components, including or excluding packet processor 210.

As shown in FIG. 7, process 700 may include receiving a current packet forwarded in a cut-through mode (block 710) and determining if there are any previous packets in the processing cycle (block 720). For example, in an implementation described above in connection with FIG. 3, packet processor 210 may receive a packet from I/O 220 via packet stream 330. In cut-through mode, packets in packet stream 330 may be forwarded before the packets are fully received, so that a packet length is not known. Downstream processing engine 320 may differentiate between a first packet (for which no previous packet length values may be available) of a processing cycle and subsequent packets of the processing cycle. A processing cycle may include, for example, a time-based or size-based iteration for performing services (e.g., by downstream processing engine 320).

Returning to FIG. 7, if the received packet is a first packet of a processing cycle (block 720—YES), process 700 may include applying an estimated packet length value to the first packet (block 730) and processing the current packet based on the applied estimated packet length value (block 740). For example, in an implementation described above in connection with FIG. 3, when a previous packet value is not available (e.g., for the first packet in a processing cycle), downstream processing engine 320 may use an estimated packet value for the packet. In one implementation, downstream processing engine 320 may include (or may access) a series of configurable registers 325 which contain estimated packet length values for a variety of output streams. For example, downstream processing engine 320 may match a header entry from a first packet with a value from one configurable register 325 reflecting the number of bytes that may be associated with the corresponding packet. In another implementation, downstream processing engine 320 may retrieve a default value (such as a MTU value) for the first packet. There may be several configurable registers 325, and downstream processing engine 320 may select the appropriate register based on the header information detected by downstream processing engine 320.

Referring again to FIG. 7, if the received packet is not a first packet of a processing cycle (block 720—NO), process 700 may include determining an actual packet length of a previous packet (block 750), applying the value of the actual packet length of the previous packet to the current packet (block 760), and processing the current packet based on the applied actual packet length value (block 770). For example, in an implementation described above in connection with FIG. 3, forward communications path 340 may deliver information, from byte counter 310 to downstream processing engine 320, that represents the actual packet length of the previous complete packet to pass through packet stream 330. For packets that are not the first packet in a processing cycle, downstream processing engine 320 may substitute the received information (e.g., the packet length value of the previous packet) as a packet length value for a next packet (e.g., a current packet that has been transmitted from byte counter 310 before being fully received) to thereby improve the accuracy of the packet processing and increase system performance.

An implementation described herein may include systems and/or methods for applying accurate packet length values when operating in a cut-through mode. The systems and/or methods may receive a current packet of an unknown length and may determine if there is a known length value of a previous packet in a processing cycle associated with the current packet. When there is no known length value of the previous packet, the systems and/or methods may apply, to the current packet, an estimated length value for the current packet. When there is a known length value of the previous packet, the systems and/or methods may apply, to the current packet, the known length value of the previous packet. The systems and/or methods may process the current packet based on the estimated length value or the known length value of the previous packet.

The systems and/or methods described herein may permit network devices to provide highly accurate packet length calculations, for a series of packets, for use in cut-through mode. Accuracy using the systems and/or methods described herein may be as effective as using actual packet length values for most practical scenarios. In one implementation, the maximum error may only be the difference between a default packet length applied to a first packet and the actual packet length of a last packet in any cycle.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 7, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a network device, a current packet forwarded in a cut-through mode;
determining, by the network device, whether to use an actual packet length, of a previous packet that is processed before the current packet, or an estimated packet length based on whether a processing cycle associated with the current packet is associated with the previous packet;
determining, by the network device, the actual packet length of the previous packet when the processing cycle associated with the current packet is associated with the previous packet;
applying, by the network device and to the current packet, a value based on the actual packet length of the previous packet when the processing cycle associated with the current packet is associated with the previous packet; and
processing, by the network device, the current packet based on the value applied to the current packet.

2. The method of claim 1, where processing the current packet includes one or more of:
performing priority flow control with respect to the current packet,
performing port/queue traffic shaping with respect to the current packet,
performing queue scheduling with respect to the current packet,
performing traffic policing with respect to the current packet,
performing tail-drop processing with respect to the current packet, or
performing counting with respect to the current packet.

3. The method of claim 1, where determining the actual packet length includes:
counting a total number of bytes of the previous packet to determine the actual packet length of the previous packet.

4. The method of claim 1, further comprising:
storing the actual packet length of the previous packet before receiving the current packet.

5. The method of claim 1, where the previous packet is processed, in a sequence of packets, immediately before the current packet.

6. The method of claim 1, further comprising:
applying, to the current packet, the value based on the estimated packet length when the processing cycle associated with the current packet is not associated with the previous packet that is processed before the current packet,
where the estimated packet length is based on one of:
a default value, or
a calculated average length of a group of other packets received before the current packet.

7. The method of claim 6, where the default value corresponds to a maximum transfer unit (MTU) size for a processor of the network device.

8. The method of claim 1, where the network device comprises one or more of:
a router,
a switch,
a gateway,
a firewall,
a network interface card (NIC),
a hub,
a bridge,
a proxy server, or
an optical add-drop multiplexer (OADM).

9. A network device comprising:
a processor to:
receive a current packet forwarded in a cut-through mode,
the current packet being of an unknown length to the processor,
determine whether to use an actual packet length, of a previous packet that is processed before the first packet, or an estimated packet length based on whether the current packet is a first packet of a processing cycle associated with the current packet,
determine the actual packet length of the previous packet of the processing cycle when the current packet is not the first packet of the processing cycle associated with the current packet,
associate, with the current packet, a value based on the actual packet length of the previous packet when the current packet is not the first packet of the processing cycle associated with the current packet, and
process the current packet based on the value associated with the packet.

10. The network device of claim 9, where, when processing the current packet, the processor is to perform one or more of:
priority flow control processing with respect to the current packet,
port/queue traffic shaping with respect to the current packet,
queue scheduling with respect to the current packet,
traffic policing with respect to the current packet,
tail-drop processing with respect to the current packet, or
counting with respect to the current packet.

11. The network device of claim 9, where, when determining the actual packet length, the processor is to:
determine the actual packet length of the previous packet by counting a total number of bytes of the previous packet.

12. The network device of claim 9, where, when determining the actual packet length, the processor is to:
retrieve, from a memory associated with the network device, the length of the previous packet when the current packet is not the first packet of the processing cycle.

13. The network device of claim 9,
where, when associating the value with the current packet, the processor is to:
apply, to the current packet, the value based on the estimated packet length when the current packet is the first packet of the processing cycle;
where the estimated packet length is based on one of:
a default value, or
a calculated average length of a group of other packets associated with one or more other processing cycles.

14. The network device of claim 9, where the default value corresponds to a maximum transfer unit (MTU) size for the processor.

15. The network device of claim 9, where the network device comprises one or more of:
a router,
a switch,
a gateway,
a firewall,
a network interface card (NIC),
a hub,
a bridge,
a proxy server, or
an optical add-drop multiplexer (OADM).

16. A method comprising:
receiving, by a processor, a current packet of a processing cycle;
determining, by the processor and before the current packet is fully received, whether to use an actual packet length, of a previous packet, that is received before the current packet, or an estimated packet length based on whether the previous packet is associated with the processing cycle;
determining, by the processor, the actual packet length of the previous packet after determining that the previous packet is associated with the processing cycle;
applying, by the processor and to the current packet, a value based on the actual packet length of the previous packet; and
processing, by the processor, the current packet based on the value.

17. The method of claim 16, further comprising:
receiving the previous packet before receiving the current packet;
determining that the previous packet is a first packet of the processing cycle; and
applying, to the previous packet, a different value based on the estimated packet length after determining that the previous packet is the first packet of the processing cycle.

18. The method of claim 16, where processing the current packet includes one or more of:
priority flow control processing with respect to the current packet,
port/queue traffic shaping with respect to the current packet,
queue scheduling with respect to the current packet,
traffic policing with respect to the current packet,
tail-drop processing with respect to the current packet, or
counting with respect to the current packet.

19. The method of claim 17, where the estimated packet length is based on one of:
a maximum transfer unit (MTU) size for the processor, or
a calculated average length of a group of packets in a previous processing cycle.

20. The method of claim 16, where the previous packet is received, in a sequence of packets, immediately before the current packet.

* * * * *